US012308146B2

(12) United States Patent
Akiyama et al.

(10) Patent No.: US 12,308,146 B2
(45) Date of Patent: May 20, 2025

(54) MULTILAYER VARISTOR

(71) Applicant: Panasonic Intellectual Property Management Co., Ltd., Osaka (JP)

(72) Inventors: Yuto Akiyama, Hokkaido (JP); Ken Yanai, Hokkaido (JP); Ryosuke Usui, Hokkaido (JP); Yuji Yamagishi, Hokkaido (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 356 days.

(21) Appl. No.: 18/068,282

(22) Filed: Dec. 19, 2022

(65) Prior Publication Data

US 2023/0207159 A1 Jun. 29, 2023

(30) Foreign Application Priority Data

Dec. 23, 2021 (JP) ................................ 2021-209885

(51) Int. Cl.
*H01C 1/14* (2006.01)
*H01C 7/10* (2006.01)

(52) U.S. Cl.
CPC ................ *H01C 1/14* (2013.01); *H01C 7/10* (2013.01)

(58) Field of Classification Search
CPC .................................. H01C 1/14; H01C 7/10
See application file for complete search history.

(56) References Cited

U.S. PATENT DOCUMENTS 4,319,215 A * 3/1982 Yamazaki .............. H01C 7/102 338/21
6,232,867 B1 * 5/2001 Yoshida ............... H01C 17/285 338/21
11,908,599 B2 * 2/2024 Kawajiri .............. H01C 7/1006
2003/0043012 A1 * 3/2003 Shiraishi ................ H01C 7/102 338/21
2004/0142809 A1 * 7/2004 Pinckney .................. C03C 4/12 65/33.9
2004/0169267 A1 * 9/2004 Matsuoka ............. H01C 1/146 257/684
2008/0238605 A1 * 10/2008 Yoshida ................ H01C 7/112 338/21
2013/0021133 A1 * 1/2013 Tanaka ................... H01C 17/28 338/21
2021/0284569 A1 * 9/2021 Bartelt .................... C03C 3/093

FOREIGN PATENT DOCUMENTS

JP 2013-026447 A 2/2013

* cited by examiner

*Primary Examiner* — Kyung S Lee
(74) *Attorney, Agent, or Firm* — Rimon P.C.

(57) ABSTRACT

A multilayer varistor includes: a sintered compact; an internal electrode provided inside the sintered compact; a high-resistivity layer arranged to cover the sintered compact at least partially and containing element Si; and an external electrode arranged to cover the high-resistivity layer partially, electrically connected to the internal electrode, and containing silver as a main component thereof. A ratio of a total mass of the alkali metals and the alkaline earth metals to a mass of the element Si in a surface region of the high-resistivity layer is equal to or less than 0.6.

6 Claims, 1 Drawing Sheet

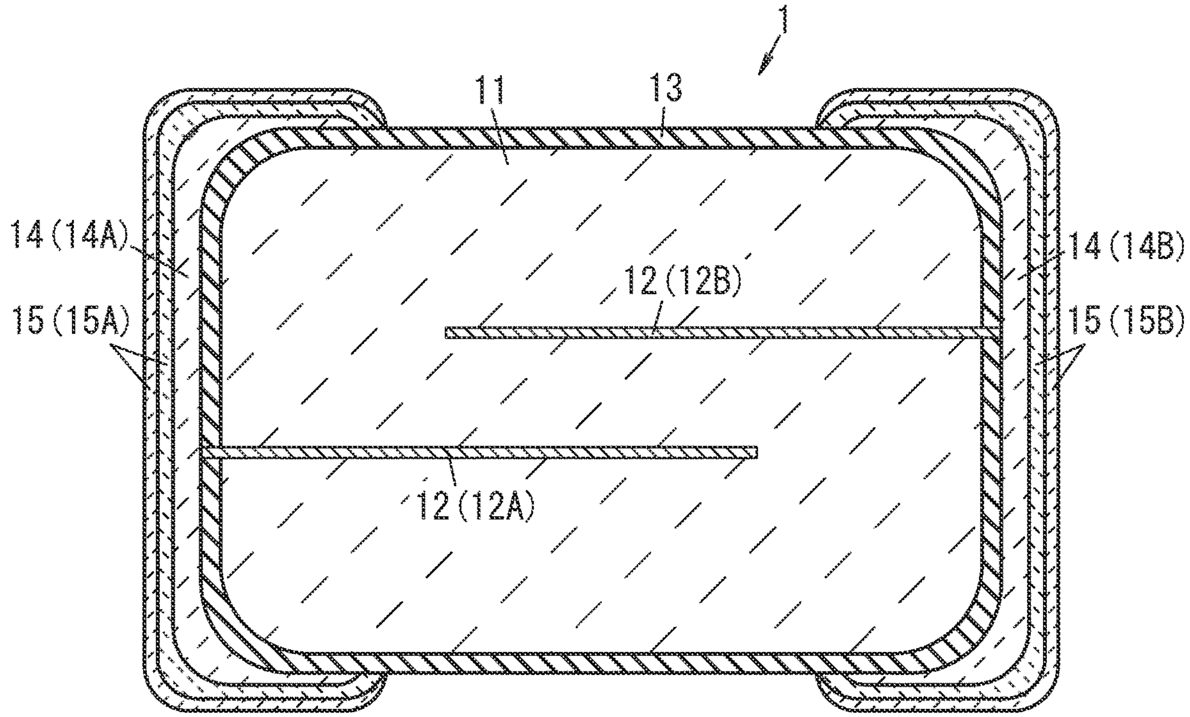
1
11
13
14 (14A)
15 (15A)
14 (14B)
15 (15B)
12 (12B)
12 (12A)

MULTILAYER VARISTOR

CROSS-REFERENCE TO RELATED APPLICATIONS

The present application is based upon, and claims the benefit of priority to, Japanese Patent Application No. 2021-209885, filed on Dec. 23, 2021, the entire contents of which are hereby incorporated by reference.

TECHNICAL FIELD

The present disclosure relates to a multilayer varistor and more particularly relates to a multilayer varistor including a sintered compact, an internal electrode, a high-resistivity layer, and an external electrode.

BACKGROUND ART

Varistors have been used to, for example, protect various types of electronic equipment and electronic devices from an abnormal voltage generated by lighting surge or static electricity, for example, and prevent the various types of electronic equipment and electronic devices from malfunctioning due to noise generated in a circuit.

JP 2013-26447 A discloses a varistor including a varistor body, an internal electrode, and an external electrode. The external electrode includes a baked electrode layer formed by applying an electrically conductive paste, including an alkali metal, onto the surface of the varistor body and baking the paste. The varistor body has a high-resistivity region formed by causing the alkali metal included in the electrically conductive paste to diffuse from an interface between the surface of the varistor body and the baked electrode layer into the varistor body.

The varistor of JP 2013-26447 A attempts to increase the resistivity on the surface of the varistor body by adding a lot of the alkali metal to the electrically conductive paste. This would reduce, during a plating process, the deposition of the plating metal onto the surface of the high-resistivity layer. In such a varistor, however, migration could be caused on the surface of the high-resistivity layer upon the appliance of voltage in a humid environment, particularly because the varistor uses an external electrode containing Ag as a main component thereof.

SUMMARY

The present disclosure provides a multilayer varistor with the ability to reduce the chances of causing migration on the surface of the high-resistivity layer.

A multilayer varistor according to an aspect of the present disclosure includes: a sintered compact; an internal electrode provided inside the sintered compact; a high-resistivity layer arranged to cover the sintered compact at least partially and containing element Si; and an external electrode arranged to cover the high-resistivity layer partially, electrically connected to the internal electrode, and containing silver as a main component thereof. A ratio of a total mass of the alkali metals and the alkaline earth metals to a mass of the element Si in a surface region of the high-resistivity layer is equal to or less than 0.6.

BRIEF DESCRIPTION OF DRAWINGS

The FIGURES depict one or more implementations in accordance with the present teaching, by way of example only, not by way of limitations. In the FIGURES, like reference numerals refer to the same or similar elements.

FIG. 1 is a schematic cross-sectional view of a multilayer varistor according to an exemplary embodiment of the present disclosure.

DETAILED DESCRIPTION

(1) Overview

A multilayer varistor according to an exemplary embodiment of the present disclosure will now be described with reference to the accompanying drawing. FIG. 1 to be referred to in the following description of embodiments is a schematic representation. Thus, the ratio of the dimensions (including thicknesses) of respective constituent elements illustrated in FIG. 1 does not always reflect their actual dimensional ratio.

As shown in FIG. 1, a multilayer varistor 1 according to an exemplary embodiment includes a sintered compact 11, internal electrodes 12, a high-resistivity layer 13, and external electrodes 14. In addition, the multilayer varistor 1 may further include plated electrodes 15 as shown in FIG. 1.

This multilayer varistor 1 is characterized in that the ratio of the total mass of the alkali metals and the alkaline earth metals to the mass of element Si in a surface region of the high-resistivity layer 13 ((total mass of alkali metals and alkaline earth metals)/mass of element Si; hereinafter sometimes referred to as an "element mass ratio (X)") is equal to or less than 0.6. As used herein, the "surface region of the high-resistivity layer" refers to an exposed range, which is not covered with any other layer, of the high-resistivity layer 13 of the multilayer varistor 1 and of which the depth as measured from the surface of the high-resistivity layer 13 falls within the detection depth of an electron probe microanalyzer (EPMA). The EPMA is a measuring instrument for analyzing constituent elements based on the wavelength and intensity of a characteristic X ray produced by irradiating the target of measurement with an electron beam. The detection depth of the EPMA normally falls within the range from 0.1 μm to 10 μm, preferably falls within the range from 0.5 μm to 2 μm, and is more preferably 1 μm.

The present inventors discovered that the chances of causing migration on the surface of the multilayer varistor 1 could be reduced by controlling the element mass ratio (X) in the surface region of the high-resistivity layer 13 formed on the surface of the sintered compact 11 to a particular value or less. It is not completely clear why this advantage is achieved by the multilayer varistor 1 having such a configuration, but the reason is presumably as follows. Specifically, in the multilayer varistor 1, migration is caused through the elution, movement, and precipitation of Ag ions from the external electrodes 14. In the high-resistivity layer 13, alkali metals and alkaline earth metals are present as metal oxides and highly hygroscopic, which would increase the chances of ionization of silver, for example, and thereby increase the chances of causing the migration. In contrast, the multilayer varistor 1 would be able to reduce the chances of causing migration on the surface of the high-resistivity layer by controlling the element mass ratio (X) to a particular value or less. The element mass ratio (X) corresponds to the abundance ratio of the alkali metals and alkaline earth metals in the surface region of the high-resistivity layer 13 and defines a mass ratio with respect to the element Si that would be a part with low hygroscopicity.

Thus, the present disclosure provides a multilayer varistor with the ability to reduce the chances of causing migration on the surface of the high-resistivity layer.

(2) Details

<Multilayer Varistor>

FIG. 1 is a cross-sectional view of a multilayer varistor 1 according to an exemplary embodiment of the present disclosure. The multilayer varistor 1 includes a sintered compact 11, internal electrodes 12, a high-resistivity layer 13, external electrodes 14, and plated electrodes 15.

The sintered compact 11 is made of a semiconductor ceramic component with a nonlinear resistance characteristic.

The external electrodes 14 are arranged to cover the high-resistivity layer 13 partially and are electrically connected to the internal electrodes 12. The multilayer varistor 1 may include at least one pair of external electrodes 14. In this embodiment, the pair of external electrodes 14 consists of a first external electrode 14A provided on one end face of the sintered compact 11 and a second external electrode 14B provided on the other end face of the sintered compact 11. When a voltage is applied between the first external electrode 14A and the second external electrode 14B, one of the first and second external electrodes 14A, 14B comes to have the higher potential and the other of the first and second external electrodes 14A, 14B comes to have the lower potential.

The internal electrodes 12 are provided inside the sintered compact 11. The internal electrodes 12 may be provided such that one internal electrode 12 or a plurality of internal electrodes 12 is/are connected to the external electrodes 14. In the multilayer varistor 1 shown in FIG. 1, the number of the internal electrodes 12 provided is two. That is to say, the internal electrodes 12 consist of a first internal electrode 12A and a second internal electrode 12B. The first internal electrode 12A is electrically connected to the first external electrodes 14A. The second internal electrode 12B is electrically connected to the second external electrodes 14B.

The plated electrodes 15 are arranged to cover the external electrodes 14 at least partially. The multilayer varistor 1 includes a first plated electrode 15A arranged to cover the first external electrode 14A at least partially and a second plated electrode 15B arranged to cover the second external electrode 14B at least partially, out of the pair of external electrodes 14.

The at least two external electrodes 14 are mounted on a printed wiring board on which an electric circuit is formed. The multilayer varistor 1 may be connected to, for example, the input end of the electric circuit. Upon the application of a voltage greater than a predetermined threshold voltage to between the first external electrode 14A and the second external electrode 14B, the electrical resistance between the first external electrode 14A and the second external electrode 14B decreases steeply to cause an electric current to flow through a varistor layer. This enables protecting the electric circuit that follows the multilayer varistor 1.

[Sintered Compact]

The semiconductor ceramic component having a nonlinear resistance characteristic as a constituent component for the sintered compact 11 may contain, for example, ZnO as a main component thereof and $Bi_2O_3$, $Co_2O_3$, $MnO_2$, $Sb_2O_3$, $Pr_6O_{11}$, $CaCO_3$, and $Cr_2O_3$ as sub-components thereof. The varistor layer constituting the sintered compact 11 may be formed by baking a ceramic sheet containing these components to cause the main component such as ZnO to be sintered and form a solid solution with some of these sub-components and to cause the other sub-components to deposit on the grain boundary.

More specifically, the sintered compact 11 may be formed by, for example, cutting off a multilayer stack, in which multiple ceramic sheets, each containing the components described above, are stacked one on top of another, into multiple pieces perpendicularly to the stacking plane and then baking the respective pieces thus cut off.

[Internal Electrodes]

The internal electrodes 12 are provided inside the sintered compact 11. Each of the internal electrodes 12 may be formed by, for example, stacking multiple ceramic sheets, each of which contains Ag, Pd, PdAg, or PtAg, for example, and to which an internal electrode paste is usually applied, one on top of another and baking the stack.

[High-Resistivity Layer]

The high-resistivity layer 13 is arranged to cover the sintered compact 11 at least partially. The high-resistivity layer 13 contains element Si. The value of the element mass ratio (X) in the surface region of the high-resistivity layer 13 may be controlled by, for example, selecting an appropriate method for forming the high-resistivity layer 13 as will be described later.

Examples of the alkali metals that may be contained in the high-resistivity layer 13 include element lithium (Li), element sodium (Na), element potassium (K), element rubidium (Rb), and element cesium (Cs). Examples of the alkaline earth metals that may be contained in the high-resistivity layer 13 includes element beryllium (Be), element magnesium (Mg), element calcium (Ca), element strontium (Sr), and element barium (Ba).

Among these elements, the elements Na, K, Mg, and Ca may be contained in a multilayer varistor 1 formed by an ordinary manufacturing method. That is to say, a value representing the total mass of the elements Na, K, Mg, and Ca may be used as an approximate value representing the total mass of the alkali metals and alkaline earth metals.

The element mass ratio (X) in the surface region of the high-resistivity layer 13 is equal to or less than 0.6. This may reduce the chances of causing migration on the surface of the high-resistivity layer 13. If the element mass ratio (X) were greater than 0.6, then the high-resistivity layer 13 would have too high hygroscopicity to avoid frequent ionization of silver, for example, which would make it impossible to reduce the chances of causing migration in the high-resistivity layer 13. The element mass ratio (X) is preferably equal to or less than 0.4, more preferably equal to or less than 0.2, even more preferably equal to or less than 0.1, and particularly preferably equal to or less than 0.01. Meanwhile, the element mass ratio (X) is preferably equal to or greater than 0.001. This would increase the resistivity of the high-resistivity layer 13 significantly enough to further reduce the deposition of plating onto the high-resistivity layer 13. The element mass ratio (X) is more preferably equal to or greater than 0.002 and even more preferably equal to or greater than 0.004. The element mass ratio (X) in the surface region of the high-resistivity layer 13 may be determined by measuring, using an EPMA, the respective abundances of element Si, alkali metals, and alkaline earth metals in the surface region of the high-resistivity layer 13 and calculating the mass ratio based on the respective atomic weights of these elements.

The high-resistivity layer 13 contains element Si. The proportion of the element Si in the high-resistivity layer 13 is preferably equal to or greater than 5% by mass and more preferably equal to or greater than 10% by mass.

The main component of the high-resistivity layer 13 is preferably either $SiO_2$ or $ZnSiO_4$. Using either $SiO_2$ or $ZnSiO_4$ each having low hygroscopicity as the main component of the high-resistivity layer 13 enables further reducing the chances of causing migration on the surface of the high-resistivity layer 13. As used herein, the "main component" refers to a component having the largest proportion by mass and specifically refers to a component, of which the proportion by mass is preferably equal to or greater than 30% by mass and more preferably equal to or greater than 50% by mass.

If the main component of the high-resistivity layer 13 is either $SiO_2$ or $ZnSiO_4$, then the proportion of $SiO_2$ or $ZnSiO_4$ in the high-resistivity layer 13 is preferably equal to or greater than 50% by mass, more preferably equal to or greater than 70% by mass, and even more preferably equal to or greater than 90% by mass. The proportion of $SiO_2$ or $ZnSiO_4$ in the high-resistivity layer 13 may even be 100% by mass and is preferably equal to or less than 99.9% by mass.

Also, the mass concentration of the alkali metals and alkaline earth metals in the high-resistivity layer 13 is preferably lower than the mass concentration of the alkali metals and alkaline earth metals in the sintered compact 11. In other words, the mass concentration of the alkali metals and alkaline earth metals is preferably lower in the high-resistivity layer 13 than in the sintered compact 11. This enables not only controlling the electrical characteristics such as a voltage of the varistor but also reducing the chances of causing migration on the surface of the high-resistivity layer 13 by using the alkali metals and alkaline earth metals in the sintered compact 11.

The average thickness of the high-resistivity layer 13 is preferably equal to or greater than 0.01 μm and equal to or less than 5 μm, more preferably equal to or greater than 0.05 μm and equal to or less than 3 μm, and even more preferably equal to or greater than 0.1 μm and equal to or less than 1 μm. As used herein, the "average thickness" refers to an arithmetic mean of the thicknesses of the high-resistivity layer 13 that have been measured on multiple points (e.g., at 10 arbitrary points) on the high-resistivity layer 13.

[External Electrodes]

The external electrodes 14 are arranged to cover the high-resistivity layer 13 partially. Also, the external electrodes 14 are electrically connected to the internal electrodes 12.

Each of the external electrodes 14 may have a single-layer structure consisting of only a primary external electrode or a multilayer structure including a primary external electrode and a secondary external electrode arranged to cover the primary external electrode, whichever is appropriate.

The external electrodes 14 each contain silver as a main component thereof. The proportion of silver in the external electrodes 14 is preferably equal to or greater than 30% by mass, more preferably equal to or greater than 60% by mass, and even more preferably equal to or greater than 90% by mass. The proportion of silver in the external electrodes 14 may even be 100% by mass.

The external electrodes 14 each contain a silver-containing component such as Ag, AgPd, or AgPt and a glass component such as $Bi_2O_3$, $SiO_2$, or $B_2O_5$.

[Plated Electrodes]

The plated electrodes 15 are arranged to cover the external electrodes 14 at least partially. The plated electrodes 15 may each include, for example: an Ni electrode arranged to cover an associated one of the external electrodes 14 at least partially; and an Sn electrode arranged to cover the Ni electrode at least partially.

<Method for Manufacturing Multilayer Varistor>

The multilayer varistor 1 may be manufactured by, for example, a manufacturing method including the following first, second, and third steps:

First step: providing a sintered compact which contains a semiconductor ceramic component as a main component thereof and in which internal electrodes are arranged;

Second step: forming a high-resistivity layer containing element Si to make the high-resistivity layer at least partially cover the sintered compact provided in the first step; and Third step: applying an external electrode paste, containing silver as a main component, to make the external electrode paste cover the high-resistivity layer partially and come into contact with the internal electrodes partially.

Optionally, the manufacturing method may further include the following fourth step:

Fourth step: forming plated electrodes to make the plated electrodes at least partially cover external electrodes made of the external electrode paste.

Next, the respective manufacturing process steps will be described one by one.

[First Step]

The first step includes providing a sintered compact 11 which contains a semiconductor ceramic component as a main component thereof and in which the internal electrodes 12 are arranged.

The semiconductor ceramic component preferably contains ZnO.

The sintered compact 11 may be formed by applying an internal electrode paste onto a ceramic sheet formed out of a slurry containing the semiconductor ceramic component, stacking a plurality of such ceramic sheets one on top of another, pressing the stack of the ceramic sheets, cutting off the stack, and then performing binder removal and baking processes. The slurry may be prepared by mixing together a semiconductor ceramic component such as ZnO as a main material, $Bi_2O_3$, $Co_2O_3$, $MnO_2$, $Sb_2O_3$, $Pr_6O_{11}$, $CaCO_3$, and $Cr_2O_3$ as sub-materials, and a binder.

As the internal electrode paste, an Ag paste, a Pd paste, a Pt paste, a PdAg paste, or a PtAg paste may be used, for example.

The temperature at which the binder removal process is conducted may be, for example, equal to or higher than 300° C. and equal to or lower than 500° C. The temperature at which the baking process is conducted may be adjusted appropriately according to, for example, the configuration and composition of the sintered compact 11 to form and may be, for example, equal to or higher than 800° C. and equal to or lower than 1300° C.

[Second Step]

The second step includes forming the high-resistivity layer 13 containing element Si to make the high-resistivity layer 13 at least partially cover the sintered compact 11 provided in the first step.

Examples of a method for forming the high-resistivity layer 13 containing element Si include (i) applying a solution containing a precursor of the high-resistivity layer 13 onto the sintered compact 11 and (ii) allowing $SiO_2$ to react with the sintered compact 11 containing ZnO as a main component thereof.

According to the method (i), the high-resistivity layer 13 containing element Si may be formed on the surface of the sintered compact 11 by, for example, applying a solution containing a precursor of the high-resistivity layer 13 onto the sintered compact 11 and then performing dehydration and curing. The precursor of the high-resistivity layer 13 may be a glass component having element Si on a main chain of polysilazane, for example. A continuous high-resistivity layer 13 containing $SiO_2$ as a main component thereof may be formed by using, as the precursor of the high-resistivity layer 13, a glass component having element Si on a main chain of polysilazane, for example. As can be seen, using $SiO_2$ having low hygroscopicity as the main component of the high-resistivity layer 13 enables further reducing the chances of causing migration on the surface of the high-resistivity layer 13. If a component containing a salt including an alkali metal or an alkaline earth metal is used as the precursor, then the content of the alkali metal or the alkaline earth metal is adjusted to allow the element mass ratio (X) in the surface region of the high-resistivity layer 13 formed to fall within a predetermined range.

Examples of a method for applying such a solution containing a precursor include spraying, immersion, and printing.

According to the method (ii), the high-resistivity layer 13 may be formed by allowing $SiO_2$ to react with the sintered compact 11 containing ZnO as a main component thereof and thereby turning a region around the surface of the sintered compact 11 into a high-resistivity layer 13 including $ZnSiO_4$ as a main component thereof. As can be seen, using $ZnSiO_4$ having low hygroscopicity as the main component of the high-resistivity layer 13 enable further reducing the chances of causing migration on the surface of the high-resistivity layer 13. Specifically, this method may be carried out by causing a powder or liquid containing $SiO_2$ to adhere onto the sintered compact 11 including ZnO as a main component thereof and then conducting heat treatment, for example. If a component containing either an alkali metal or an alkaline earth metal is used as the sintered compact 11, then the content of the alkali metal or the alkaline earth metal is adjusted to allow the element mass ratio (X) in the surface region of the high-resistivity layer 13 formed to fall within a predetermined range.

[Third Step]

The third step includes applying an external electrode paste, containing silver as a main component thereof, to make the external electrode paste cover the high-resistivity layer 13 partially and come into contact with the internal electrodes 12 partially.

The external electrode paste containing silver as a main component thereof may be prepared by mixing together a silver component such as an Ag powder, an AgPd powder, or an AgPt powder, a glass component such as $Bi_2O_3$, $SiO_2$, or $B_2O_5$, and a solvent. Alternatively, a paste containing silver as a main component thereof and a resin component, for example, may also be used as the external electrode paste. Baking, at a temperature equal to or higher than 700° C. and equal to or lower than 800° C., the external electrode paste that has been applied enables promoting alloying with the internal electrodes 12 and thereby forming external electrodes 14 with an increased degree of adhesion.

[Fourth Step]

The fourth step includes forming plated electrodes 15 to make the plated electrodes 15 at least partially cover the external electrodes 14 made of the external electrode paste. Examples of a method for forming the plated electrodes 15 include performing Ni plating and Sn plating in this order by electrolytic plating, for example.

EXAMPLES

The present disclosure will now be described more specifically by way of illustrative examples. Note that the specific examples to be described below are only examples of the present disclosure and should not be construed as limiting.

<Manufacturing Multilayer Varistor>

Multilayer varistors representing first and second examples and first and second comparative examples were manufactured in the following procedure.

[Forming Sintered Compact]

(Preparing Slurry)

A slurry was prepared by mixing together ZnO as a main material, $Pr_6O_{11}$, $Co_2O_3$, $CaCO_3$, $Cr_2O_3$, and other compounds as sub-materials, and a binder.

(Forming Ceramic Sheet)

A ceramic sheet was formed to a predetermined thickness equal to or greater than 20 μm and equal to or less than 50 μm out of the slurry that had been prepared as described above.

(Forming Multilayer Stack)

A Pd paste was used as an internal electrode paste, which was printed in a predetermined pattern onto the ceramic sheet that had been formed as described above. Then, such ceramic sheets on each of which the internal electrode paste had been printed and ceramic sheets on which no internal electrode paste had been printed were stacked one on top of another to form a predetermined electrode structure. The multilayer stack thus formed was pressed to have a predetermined thickness and then cut off into multiple pieces, each having a length of 1.0 mm, a width of 0.5 mm, and a height of 0.5 mm. In this manner, multiple pieces of the multilayer stack were obtained.

(Forming Sintered Compact)

Each of the multiple pieces of the multilayer stack was subjected to a binder removal process conducted at a temperature equal to or higher than 300° C. and equal to or lower than 500° C. and then baked at a temperature equal to or higher than 800° C. and equal to or lower than 1300° C., thereby forming a sintered compact.

[Forming High-Resistivity Layer]

First Example

A coating solution containing polysilazane was sprayed, using a sprayer, onto the sintered compact that had been formed as described above, and then the precursor adhering to the sintered compact was cured at a temperature equal to or higher than 400° C. and equal to or lower than 600° C., thereby forming a high-resistivity layer.

Second Example

An aqueous solution of sodium silicate containing element Si and element Na at a mass ratio of 2:1 was sprayed, using a sprayer, as a coating solution and then subjected to heat treatment at a temperature equal to or higher than 700° C. and equal to or lower than 900° C., thereby forming a high-resistivity layer of $ZnSiO_4$.

(First Comparative Example)

Sodium carbonate, potassium carbonate, magnesium carbonate, and calcium carbonate were allowed to adhere, using a hermetically sealed rotating pot, to the sintered compact that had been formed as described above. The materials thus adhered were heat-treated, using an electric furnace, in the air at a temperature equal to or higher than 650° C. and equal to or lower than 900° C. to cause the alkali metals and the alkaline earth metals to diffuse. In this manner, a high-resistivity layer was formed.

(Second Comparative Example)

A high-resistivity layer was formed in the same way as in the first comparative example except that the sodium carbonate, potassium carbonate, magnesium carbonate, and calcium carbonate were allowed to adhere to the sintered compact at a different composition ratio from in the first comparative example.

[Forming External Electrodes]

An external electrode paste was prepared by mixing an Ag powder, a glass frit, and a solvent together. The external electrode paste was applied onto end faces of the sintered compact on which the high-resistivity layer had been formed and then baked at 800° C., thereby forming external electrodes.

[Forming Plated Electrodes]

An Ni plated electrode was formed by electrolytic plating to a predetermined thickness on each of the external electrodes that had been formed as described above, and then an Sn plated electrode was formed thereon.

Evaluation

[Measuring Element Mass Ratio]

As to the multilayer varistor that had been formed as described above, the respective abundances of elements Si, K, Na, Mg, and Ca in the surface region of the high-resistivity layer were measured by the following measuring method using an EPMA, thereby calculating the element mass ratios K/Si, Na/Si, Mg/Si, and Ca/Si and determining the element mass ratio (K+Na+Mg+Ca)/Si as shown in the following Table 1.

(Measuring Method)

Measuring instrument: electron probe microanalyzer (JXA-8100-EPMA manufactured by JEOL Ltd.)

Measuring condition: an acceleration voltage of 15 kV, an irradiation current of 50 nA, a measuring time of 10 sec, a beam size of 200 $\mu m^2$, and an analytical X ray and analyzing crystal: Na Kα (1.191 am) and TAPH (acidic rubidium phthalate).

[Evaluation about Whether Migration was Caused]

Evaluation was made, by conducting a humidity load test under the following condition, about whether the multilayer varistor that had been formed as described above caused migration.

(Condition)

Temperature: 85° C., relative humidity: 85% RH, load voltage: 18 V, and test time: 1000 h.

(Evaluation about Migration)

After the humidity load test was conducted, the appearance of the multilayer varistor was observed to see if any silver was deposited onto the surface of the high-resistivity layer, i.e., whether any migration was caused or not.

TABLE 1

| Element mass ratio | Ex.1 | Ex.2 | Cmp. Ex.1 | Cmp. Ex.2 |
|---|---|---|---|---|
| K/Si | 0.004 | 0.000 | 0.420 | 0.137 |
| Na/Si | 0.000 | 0.552 | 0.151 | 0.118 |
| Mg/Si | 0.000 | 0.000 | 0.037 | 0.083 |
| Ca/Si | 0.000 | 0.000 | 0.388 | 0.363 |
| (K + Na + Mg + Ca)/Si | 0.004 | 0.552 | 0.996 | 0.701 |
| Frequency of occurrence of migration | 0/10 | 0/10 | 10/10 | 10/10 |

As can be seen from the results shown in Table 1, the multilayer varistors according to the first and second examples had element mass ratios (K+Na+Mg+Ca)/Si of 0.004 and 0.552, respectively, both of which fell within the permissible range of the present disclosure, indicating that the chances of causing migration were reduced. On the other hand, the multilayer varistors according to the first and second comparative examples had element mass ratios (K+Na+Mg+Ca)/Si of 0.996 and 0.701, respectively, both of which fell outside of the permissible range of the present disclosure, indicating that migration was caused.

(Recapitulation)

As can be seen from the foregoing description of the exemplary embodiment and specific examples, a multilayer varistor (1) according to a first aspect includes: a sintered compact (11); an internal electrode (12) provided inside the sintered compact (11); a high-resistivity layer (13) arranged to cover the sintered compact (11) at least partially and containing element Si; and an external electrode (14) arranged to cover the high-resistivity layer (13) partially, electrically connected to the internal electrode (12), and containing silver as a main component thereof. A ratio of a total mass of the alkali metals and the alkaline earth metals to a mass of the element Si in a surface region of the high-resistivity layer (13) is equal to or less than 0.6.

The first aspect enables reducing the chances of causing migration on the surface of the high-resistivity layer by setting the proportion of the alkali metals and alkaline earth metals, which are present as highly hygroscopic metal oxides in the high-resistivity layer (13) and increase the chances of causing ionization of silver, for example, at a particular value or less.

In a multilayer varistor (1) according to a second aspect, which may be implemented in conjunction with the first aspect, the ratio is equal to or greater than 0.001.

The second aspect enables increasing the resistivity of the high-resistivity layer (13) and thereby further reducing the deposition of plating onto the high-resistivity layer (13).

In a multilayer varistor (1) according to a third aspect, which may be implemented in conjunction with the first or second aspect, the total mass of the alkali metals and the alkaline earth metals is a total mass of elements Na, K, Mg, and Ca.

According to the third aspect, the elements that may be contained in the multilayer varistor (1) formed by a normal manufacturing method are Na. K, Mg, and Ca, and therefore, the total mass of the elements Na, K, Mg, and Ca may be used as an approximate value of the total mass of the alkali metals and the alkaline earth metals.

In a multilayer varistor (1) according to a fourth aspect, which may be implemented in conjunction with any one of the first to third aspects, the high-resistivity layer (13) contains $SiO_2$ as a main component thereof.

The fourth aspect enables further reducing the chances of causing migration on the surface of the high-resistivity layer (13) by using $SiO_2$ with low hygroscopicity as a main component thereof.

In a multilayer varistor (1) according to a fifth aspect, which may be implemented in conjunction with any one of the first to third aspects, the high-resistivity layer (13) contains $ZnSiO_4$ as a main component thereof.

The fifth aspect enables further reducing the chances of causing migration on the surface of the high-resistivity layer (13) by using $ZnSiO_4$ with low hygroscopicity as a main component thereof.

In a multilayer varistor (1) according to a sixth aspect, which may be implemented in conjunction with any one of the first to fifth aspects, a mass concentration of the alkali metals and the alkaline earth metals in the high-resistivity layer (13) is lower than a mass concentration of the alkali metals and the alkaline earth metals in the sintered compact (11).

The sixth aspect enables, by using the alkali metals and alkaline earth metals in the sintered compact (11), controlling electrical characteristics such as a varistor voltage and reducing the chances of causing migration on the surface of the high-resistivity layer (13).

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A multilayer varistor comprising:

a sintered compact;

an internal electrode provided inside the sintered compact;

a high-resistivity layer arranged to cover the sintered compact at least partially and containing element Si; and an external electrode arranged to cover the high-resistivity layer partially, electrically connected to the internal electrode, and containing silver as a main component thereof, a ratio of a total mass of the alkali metals and the alkaline earth metals to a mass of the element Si in a surface region of the high-resistivity layer being equal to or less than 0.6.

2. The multilayer varistor of claim 1, wherein the ratio is equal to or greater than 0.001.

3. The multilayer varistor of claim 1, wherein the total mass of the alkali metals and the alkaline earth metals is a total mass of elements Na, K, Mg, and Ca.

4. The multilayer varistor of claim 1, wherein the high-resistivity layer contains $SiO_2$ as a main component thereof.

5. The multilayer varistor of claim 1, wherein the high-resistivity layer contains $ZnSiO_4$ as a main component thereof.

6. The multilayer varistor of claim 1, wherein a mass concentration of the alkali metals and the alkaline earth metals in the high-resistivity layer is lower than a mass concentration of the alkali metals and the alkaline earth metals in the sintered compact.

* * * * *